L. F. BIESMEYER & J. TEMMEN.
RESILIENT WHEEL.
APPLICATION FILED NOV. 18, 1915.
1,183,272.
Patented May 16, 1916.
2 SHEETS—SHEET 1.
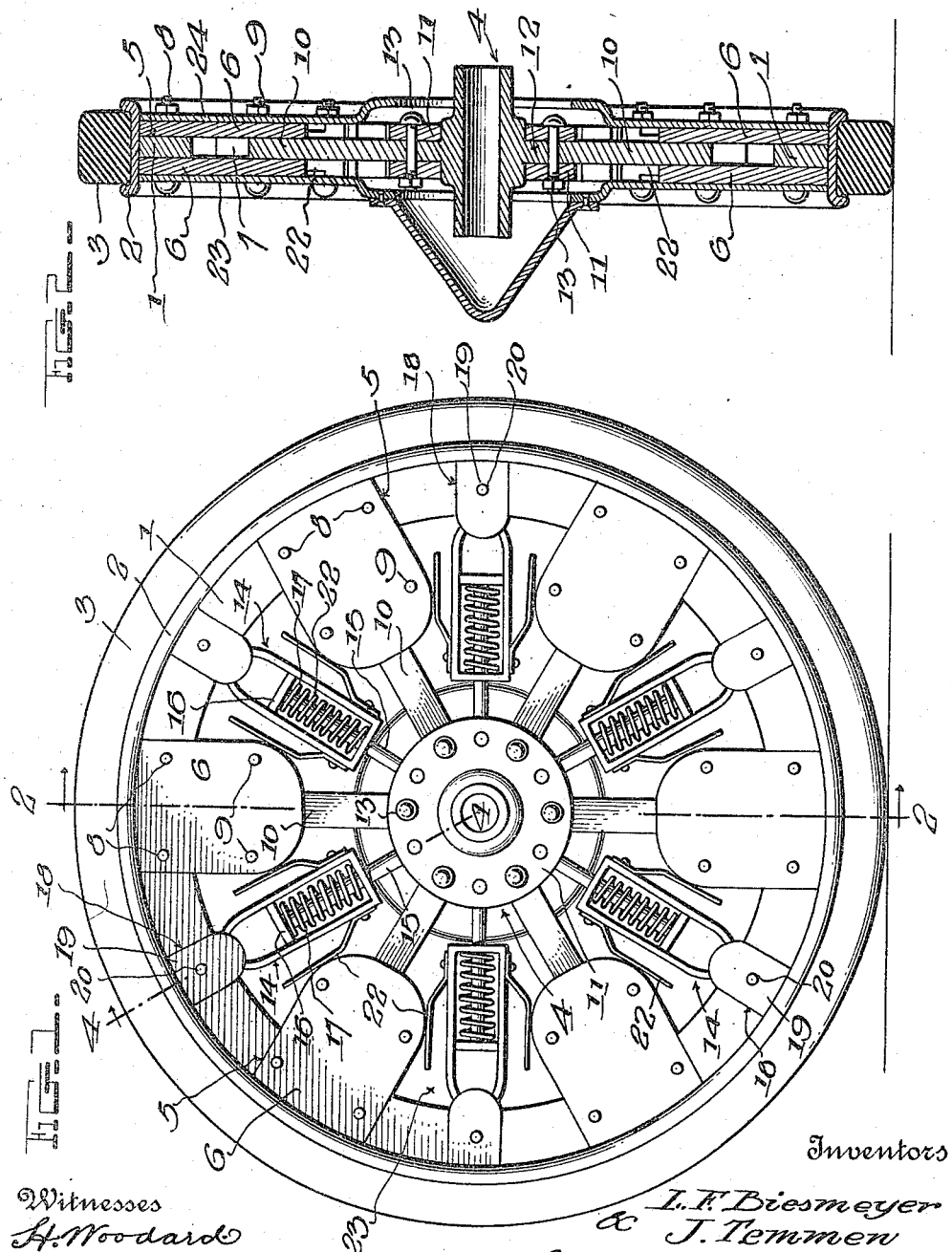

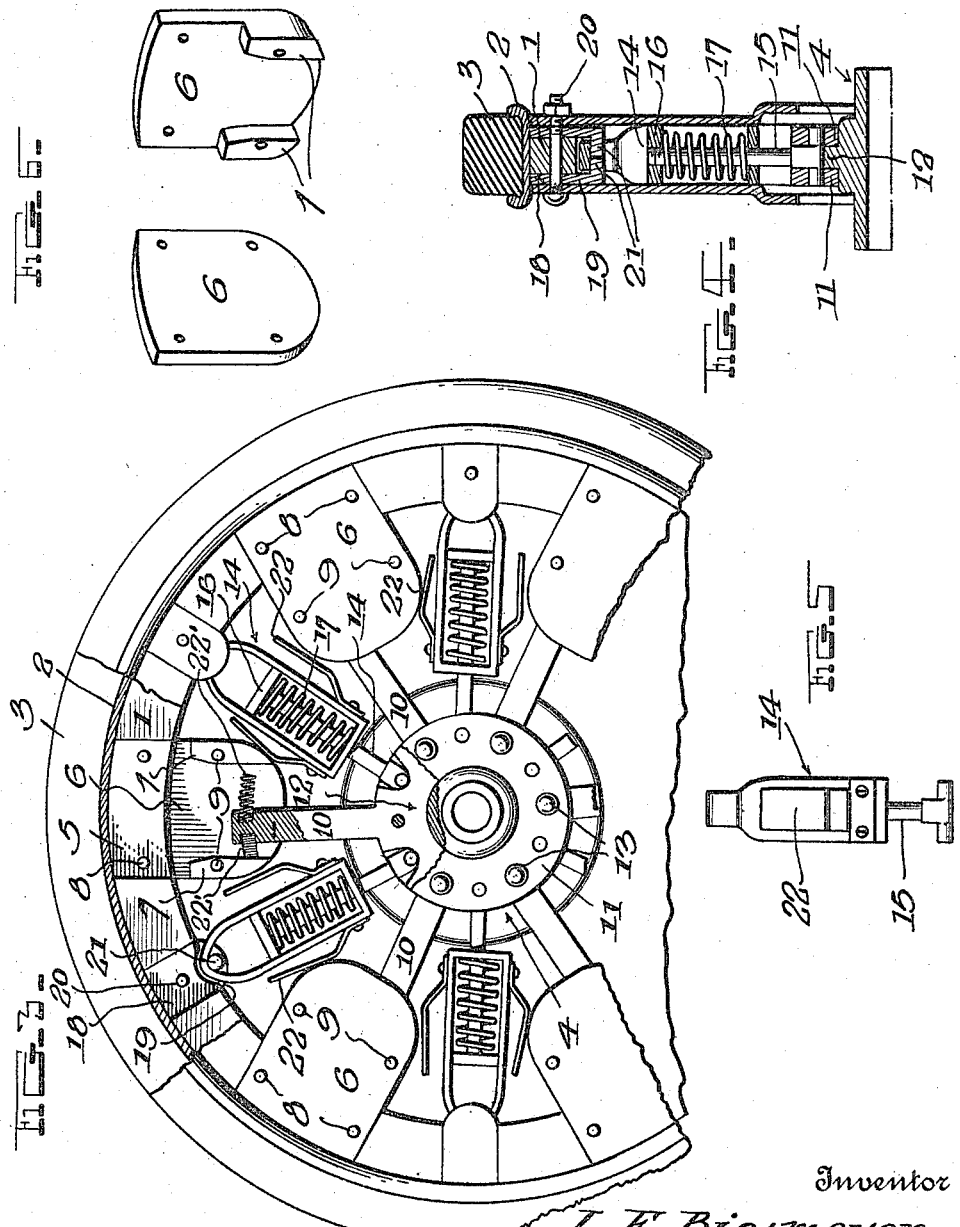

UNITED STATES PATENT OFFICE.

LORENZ F. BIESMEYER, OF BONNOTS MILL, AND JOSEPH TEMMEN, OF WESTPHALIA, MISSOURI.

RESILIENT WHEEL.

1,183,272.

Specification of Letters Patent.

Patented May 16, 1916.

Application filed November 18, 1915. Serial No. 62,195.

*To all whom it may concern:*

Be it known that we, LORENZ F. BIESMEYER, a citizen of the United States, residing at Bonnots Mill, in the county of Osage and State of Missouri, and JOSEPH TEMMEN, a citizen of the United States, residing at Westphalia, in the county of Osage and State of Missouri, have invented certain new and useful Improvements in Resilient Wheels; and we do declare the following to be a full, clear, and exact description of the invention, such as will enable others skilled in the art to which it appertains to make and use the same.

This invention relates to improvements in resilient wheels and has for one object to provide a device of this character which will take the place of the ordinary cushion or pneumatic tire.

A further object of the invention is to provide novel means for preventing excessive lagging of the outer rim portion of the wheel when the vehicle to which the wheel is applied starts to move, and to return said outer portion to its normal position.

With the foregoing general objects in view, our invention resides in certain novel features of construction, combination, and arrangement of parts which will hereinafter be more particularly described and claimed.

In the accompanying drawings: Figure 1 is a front elevation of one of our improved wheels showing the front cover plate removed; Fig. 2 is a vertical section taken on the line 2—2 of Fig. 1; Fig. 3 is a side elevation of a portion of the wheel with the front plate removed and showing the position of parts as they will appear just as the machine to which the wheel is applied starts; Fig. 4 is a detail section taken on the line 4—4 of Fig. 1; Fig. 5 is an edge view of the resilient spoke removed from the wheel; and Fig. 6 is a detail perspective view of the plates forming guides for the rigid arms.

Our preferred form of resilient wheel comprises an outer rim section 1 to which is adapted to be applied the usual rim 2 adapted to hold the solid or semi-solid rubber tire 3, and an inner or hub member 4. The outer member 1 is annular in form and composed of any suitable material of sufficient strength to withstand the strain to which all automobile wheels are subjected. At predetermined points on the sides of this annular rim member, notches or recesses 5 are formed for the reception of the plates 6. In the accompanying drawings, six of these plates are shown on each side of the rim member, their inner ends being spaced apart by the spacing blocks 7, thus forming a guide socket between the plates for a purpose to appear. Bolts 8 and 9 pass through the rim member and through the plates and spacing blocks to secure the same in correct relation to one another. Each of these guides formed of the plates 6 is adapted to receive a radially extending stop arm 10 which projects outwardly from the hub member 4, the inner end of said arms being fixed in said hub to rotate therewith. As the outer ends of these arms are free, they have a sliding movement in said guides, said movement being both lateral and up and down. The hub member 4 to which the arms 10 are secured, may be formed of any preferred construction, but is here shown as formed of a pair of annular plates 11 between which the arm carrying plate 12 is adapted to be clamped by the bolts 13 passing therethrough. As it will readily appear from an examination of the drawings, the arm carrying plate 12 is of the same diameter as the plates 11 and has the arms 10 formed integrally therewith, while between the arms in the edge of the plate are formed notches for a purpose which will shortly appear. The opening formed through the center of said plates is for the reception of the axle of the vehicle.

In addition to the arms 10 and the guides 6, resilient spokes also connect the hub member 4 with the rim member 1, and each of these spokes is formed in two sections, an outer section or member in the form of a yoke 14 which is pivoted to the rim member 1, and an inner member 15 in the form of a rod whose inner end is pivoted between the plates 11 of the hub member 4. This rod 15 preferably has a T-shaped inner end, which is disposed in one of the notches in the arm carrying plate 12, the head of said T being received in apertures in the plates 11, thereby pivoting the rod between said plates. The outer end of the rod has secured thereto a square stop 16 between which and the inner end of the yoke an extension spring 17 is placed, said spring encircling the rod 15 as shown. Each of the yokes 14 is substantially U-shaped with the ends of their parallel arms connected by a flat plate against which the inner end of the spring 17 abuts, the rounded end of the U being pivotally connected to the rim by means about to be described. By this means, the inner and outer sections of the wheel are resiliently connected, the shocks received by said rim member being absorbed by the springs 17, and therefore not transmitted to the body of the vehicle.

The rim member 1 is recessed on opposite sides as shown at 18, adjacent the outer end of each of the yokes 14, and the recesses are adapted to form seats for the stud carrying plates 19, bolts 20 being passed through said plates and the rim member to hold the same in position thereon. These plates 19 are provided on their inner faces with inwardly extending pivot studs 21 which project below the curved outer end of the yokes 14, thereby pivoting the same to the rim member. As shown in the several figures, the inner edge of the rim member is notched to receive the curved ends of said yokes.

In the ordinary form of resilient wheel, the rim member has a tendency to lag behind the hub member when the vehicle to which the wheel is applied starts. If this action is carried to a too great extent, the wheel is liable to be injured. Therefore, we have provided means for preventing excessive lagging motion on the part of the rim member and also means for returning said rim member to its normal position when the strain of starting has been removed. This means consists in adding flat leaf springs 22 to opposite sides of the yokes 14, the outer portions of said springs being adapted to abut the guides 6 which are interposed between said spoke members. These springs exert a movement which tends to prevent the lagging of the outer member and help to hold the wheel in normal position. Although we have shown flat leaf springs for this purpose, it is obvious that other forms of springs could be used to equal advantage with only slight modifications of the adjacent parts of the wheel.

From the foregoing description, taken in connection with the accompanying drawings, it will be obvious that we have invented a much improved form of resilient wheel which will readily accomplish all the purposes for which it is designed. It is evident that the wheel will operate as described, but we propose to further perfect the same by covering the working parts so as to exclude mud and dust therefrom. This is accomplished by providing circular cover plates 23 and 24 of slightly smaller diameter than the outer diameter of the rim member, said plates being adapted to be placed on opposite sides of said wheel and secured thereto by the bolts which hold the plates 6 and 19 in position. As it is necessary to leave openings in the center of these plates for the axle and hub of the vehicle, dirt is liable to enter through said openings if the same are not protected. Therefore, a cap is added to the outer plate 23 and secured thereto by any preferred means, said cap covering the hub and effectively preventing the entrance of dust or dirt in other forms within said casing formed by the plates.

With an improved wheel such as shown in the drawings, the usual forms of tire trouble are readily overcome inasmuch as a solid tire is preferably used. While overcoming the usual defects, the resiliency of the pneumatic tire is not sacrificed. It may also become necessary in some instances to provide additional springs to aid the springs 22. In such case, coil springs 22' are preferably added to the arms 10 as shown in Fig. 3, and are adapted to coact with the spacing blocks 7. This arrangement adds materially to the resiliency of the wheel.

We claim:

1. In a resilient wheel, a hub member, radially extending stop arms fixed therein, a rim member, inwardly extending guides thereon adapted to loosely receive the outer ends of said arms, each of said guides being formed of a pair of plates secured to the rim member, spacing blocks being interposed therebetween, resilient spokes interposed between said arms, each comprising a yoke pivoted to the rim member, an inner member having a stop on its outer end adapted to slide therein, its inner end being pivoted in the hub member, and springs carried by the yokes and adapted to bear against said guides to prevent excessive lag of the rim member when starting the vehicle to which the wheel is applied and to return said rim member to its normal position.

2. In a resilient wheel, a hub member comprising a pair of plates having a series of annularly arranged alined openings, an arm carrying plate interposed therebetween and having notches alined with said openings, radial arms extending therefrom, a rim member, resilient spokes pivoted by their outer ends to said rim member, said spokes having T-shaped heads on their inner ends disposed in said notches, the arms of the heads being in said alined openings to pivot the spokes to the hub member.

3. In a resilient wheel, a hub member comprising a pair of plates having a series of annularly arranged alined openings, an arm carrying plate interposed therebetween and having notches alined with said openings, radial arms extending therefrom, a rim member, resilient spokes comprising U-shaped yokes pivoted by their rounded ends to the rim, flat plates connecting the other ends of the arms of the yokes, rods slidable through said plates, square stops on the outer ends of said rods, springs interposed between said stops and said flat plates, and T-shaped heads on the inner ends of said rods and disposed in said notches, the arms of said heads being in said alined openings to pivot the spokes to the hub member.

In testimony whereof we have hereunto set our hands in presence of two subscribing witnesses.

LORENZ F. BIESMEYER.
JOSEPH TEMMEN.

Witnesses:
HENRY V. PARTY,
LOUIS MAIRE.

Copies of this patent may be obtained for five cents each, by addressing the "Commissioner of Patents, Washington, D. C."